(12) United States Patent
Azuma et al.

(10) Patent No.: US 8,904,772 B2
(45) Date of Patent: Dec. 9, 2014

(54) ENGINE EXHAUST GAS HEAT EXCHANGER AND ENERGY SUPPLYING DEVICE USING THE SAME

(75) Inventors: Hiroshi Azuma, Osaka (JP); Kosuke Matsuura, Osaka (JP)

(73) Assignee: Yanmar Co., Ltd., Osaka-shi (JP)

(\*) Notice: Subject to any disclaimer, the term of this patent is extended or adjusted under 35 U.S.C. 154(b) by 150 days.

(21) Appl. No.: 13/583,774

(22) PCT Filed: Mar. 10, 2011

(86) PCT No.: PCT/JP2011/055633
§ 371 (c)(1),
(2), (4) Date: Sep. 10, 2012

(87) PCT Pub. No.: WO2011/111776
PCT Pub. Date: Sep. 15, 2011

(65) Prior Publication Data
US 2013/0000286 A1 Jan. 3, 2013

(30) Foreign Application Priority Data

Mar. 12, 2010 (JP) .................................. 2010-055573
Mar. 12, 2010 (JP) .................................. 2010-055575

(51) Int. Cl.
*F01N 3/02* (2006.01)
*F01N 3/28* (2006.01)
(Continued)

(52) U.S. Cl.
CPC ................ *F01N 3/2889* (2013.01); *F01N 5/02* (2013.01); *F28F 9/0246* (2013.01); *F28F 13/02* (2013.01); *F28F 13/06* (2013.01); *F28D 7/0066* (2013.01); *F28D 7/103* (2013.01); *F28D 7/106* (2013.01); *F28F 1/10* (2013.01); *F01N 2260/08* (2013.01); *F01N 2470/18* (2013.01); *F01N 2470/24* (2013.01); *F28D 21/0003* (2013.01); *Y02T 10/16* (2013.01); *F01N 2470/04* (2013.01); *F28F 2265/26* (2013.01); *Y02B 30/52* (2013.01)
USPC ................... 60/320; 60/298; 60/321; 165/51; 165/52; 165/66; 165/254

(58) Field of Classification Search
CPC ........ F01N 2240/02; F28F 9/0137; F28F 1/36
USPC ........ 60/274, 298, 299, 320, 321; 165/51, 52, 165/65, 66, 254
See application file for complete search history.

(56) References Cited

U.S. PATENT DOCUMENTS 3,844,343 A 10/1974 Burggraf
4,685,292 A * 8/1987 Brigham et al. ................ 60/320

(Continued)

FOREIGN PATENT DOCUMENTS

CA 2705048 4/2009
EP 2196648 A1 6/2010

(Continued)

OTHER PUBLICATIONS

The European office action issued on May 27, 2014 in the counterpart European patent application.

*Primary Examiner* — Binh Q Tran
(74) *Attorney, Agent, or Firm* — Marvin A. Motsenbocker; Mots Law, PLLC

(57) ABSTRACT

Regarding an engine exhaust gas heat exchanger that allows exhaust gas to collide with a coolant passage through apertures, a configuration that can improve efficiency of heat exchange is provided. The engine exhaust gas heat exchanger 1 is provided with multiple stages of unit exhaust gas passages 3a, 3b, 3c that are configured with a first exhaust gas passage A in which a plane facing an inlet is blocked and that has a plurality of apertures 30 in a circumferential direction and in a flow direction, and a second exhaust gas passage B that has a dividing wall facing the apertures 30 and also serving as the coolant passage 20 and an outlet that also serves as an inlet of the first exhaust gas passage A of a next stage or an outlet 26 of the engine exhaust gas heat exchanger 1.

17 Claims, 6 Drawing Sheets

(51) Int. Cl.
  *F01N 5/02*   (2006.01)
  *F28F 9/02*   (2006.01)
  *F28F 13/02*  (2006.01)
  *F28F 13/06*  (2006.01)
  *F28D 7/00*   (2006.01)
  *F28D 7/10*   (2006.01)
  *F28F 1/10*   (2006.01)
  *F28D 21/00*  (2006.01)

(56) References Cited

U.S. PATENT DOCUMENTS

| | | | |
|---|---|---|---|
| 4,694,894 A | 9/1987 | Kito et al. | |
| 5,228,513 A | 7/1993 | Hemsath | |
| 5,468,384 A | 11/1995 | Garcera et al. | |
| 6,151,891 A * | 11/2000 | Bennett | 60/298 |
| 6,832,475 B2 * | 12/2004 | Tanaka et al. | 60/298 |
| 7,121,325 B2 * | 10/2006 | Kruger et al. | 165/51 |
| 8,327,634 B2 * | 12/2012 | Orihashi et al. | 60/320 |
| 8,448,429 B2 * | 5/2013 | Fukudome et al. | 60/320 |
| 8,522,537 B2 * | 9/2013 | Lee et al. | 60/320 |
| 2010/0205946 A1 | 8/2010 | Fukudome et al. | |

FOREIGN PATENT DOCUMENTS

| | | |
|---|---|---|
| JP | 60 078920 U | 6/1985 |
| JP | H01-145931 U | 10/1989 |
| JP | 2008-35595 | 2/2008 |
| JP | 2008-175461 A | 7/2008 |
| JP | 2009-092016 A | 4/2009 |
| JP | 2009-156162 A | 7/2009 |
| WO | 89/01599 A1 | 2/1989 |
| WO | WO2009048090 A1 | 4/2009 |

* cited by examiner

ENGINE EXHAUST GAS HEAT EXCHANGER AND ENERGY SUPPLYING DEVICE USING THE SAME

TECHNICAL FIELD

The present invention relates to an engine exhaust gas heat exchanger for use in engine-driven air conditioners, cogeneration systems, and the like.

BACKGROUND ART

Heretofore, regarding an exchanger of heat between engine exhaust gas and coolant, a configuration is known in which a plurality of apertures facing the coolant passage are provided in the circumferential direction and the exhaust gas flow direction of the exhaust gas passage so as to allow the entire amount of exhaust gas to collide with the coolant passage (see Patent Document 1 and 2).

PRIOR ART DOCUMENT

Patent Document

[Patent Document 1] Japanese Patent No. 4324216
[Patent Document 2] Japanese Patent No. 4324219

SUMMARY OF INVENTION

Problems to be Solved by the Invention

However, the aforementioned conventional engine exhaust gas heat exchanger is configured to discharge the entire amount of exhaust gas at once throughout the heat exchanger in the exhaust gas flow direction, and therefore in the case where the number of apertures is increased to enlarge the heat transfer area, the flow rate per aperture is decreased, making it difficult to maintain a specific average heat transfer coefficient (K value).

Also, the aforementioned conventional engine exhaust gas heat exchanger is described as merely having apertures that are open in a cylindrical manner, and no specific shape thereof is disclosed.

The present invention was conceived in light of this circumstance, and an object thereof is to provide, regarding an engine exhaust gas heat exchanger that allows exhaust gas to collide with a coolant passage through apertures, an engine exhaust gas heat exchanger having apertures that can improve efficiency of heat exchange.

Also, an object of the present invention is to provide a configuration with which, while increasing the number of apertures to enlarge the heat transfer area, a decrease of the flow rate per aperture is prevented, thus making it possible to maintain a specific heat transfer coefficient.

Means for Solving the Problems

The engine exhaust gas heat exchanger of the present invention for solving the aforementioned problem is an exchanger of heat between engine exhaust gas and coolant, in which a plurality of apertures facing a coolant passage is provided in a circumferential direction and an exhaust gas flow direction of an exhaust gas passage to allow the entire amount of exhaust gas to collide with the coolant passage, the engine exhaust gas heat exchanger being provided with multiple stages of a unit exhaust gas passage that is configured with a first exhaust gas passage in which a plane facing an inlet is blocked and that has a plurality of apertures in a circumferential direction and in a flow direction, and a second exhaust gas passage that has a dividing wall facing the apertures and also serving as the coolant passage and an outlet that also serves as an inlet of the first exhaust gas passage of a next stage or an outlet of the engine exhaust gas heat exchanger.

In the engine exhaust gas heat exchanger, the coolant passage is provided on both inner circumferential side and outer circumferential side of the unit exhaust gas passage, and the apertures facing the respective coolant passages are provided in the first exhaust gas passage.

In the engine exhaust gas heat exchanger, the apertures facing the coolant passage on the outer circumferential side are provided in greater number the apertures facing the coolant passage on the inner circumferential side.

In the engine exhaust gas heat exchanger, for every unit exhaust gas passage, a dividing wall having the apertures of the first exhaust gas passage is elastically supported in an axial direction of the unit exhaust gas passage by the dividing wall of the second exhaust gas passage facing the apertures and also serving as the coolant passage.

In the engine exhaust gas heat exchanger, an exhaust gas purification catalyst is partially or entirely accommodated in the first exhaust gas passage of a first-stage unit exhaust gas passage, and an exhaust gas temperature sensor is provided between an outlet plane of the catalyst and the blocked plane of the first exhaust gas passage.

In the engine exhaust gas heat exchanger, a total area of the apertures in each unit exhaust gas passage is different in all stages or in some stages.

In the engine exhaust gas heat exchanger, each aperture has such a shape that an area through which exhaust gas travels gradually decreases from an inlet to an outlet.

In the engine exhaust gas heat exchanger, the area of each aperture through which exhaust gas travels is the same from a midsection to the outlet.

In the engine exhaust gas heat exchanger, groove processing is performed on an exhaust gas colliding surface of the coolant passage.

Also, the energy supplying device of the present invention to solve the aforementioned problem is an energy supplying device, such as an engine-driven heat pump and a cogeneration, in which the aforementioned engine exhaust gas heat exchanger is used in an engine exhaust gas passage.

Effects of the Invention

As described above, the present invention provides a configuration in which the exhaust gas passage is divided into unit exhaust gas passages and the entire amount of exhaust gas is injected in every unit passage, and therefore a decrease of the flow rate per aperture is prevented while the heat transfer area is enlarged by increasing the number of apertures, thus making it possible to maintain a specific average heat transfer coefficient.

MODE FOR CARRYING OUT THE INVENTION

Embodiments of the present invention will now be described with reference to the drawings.

Figure 1:
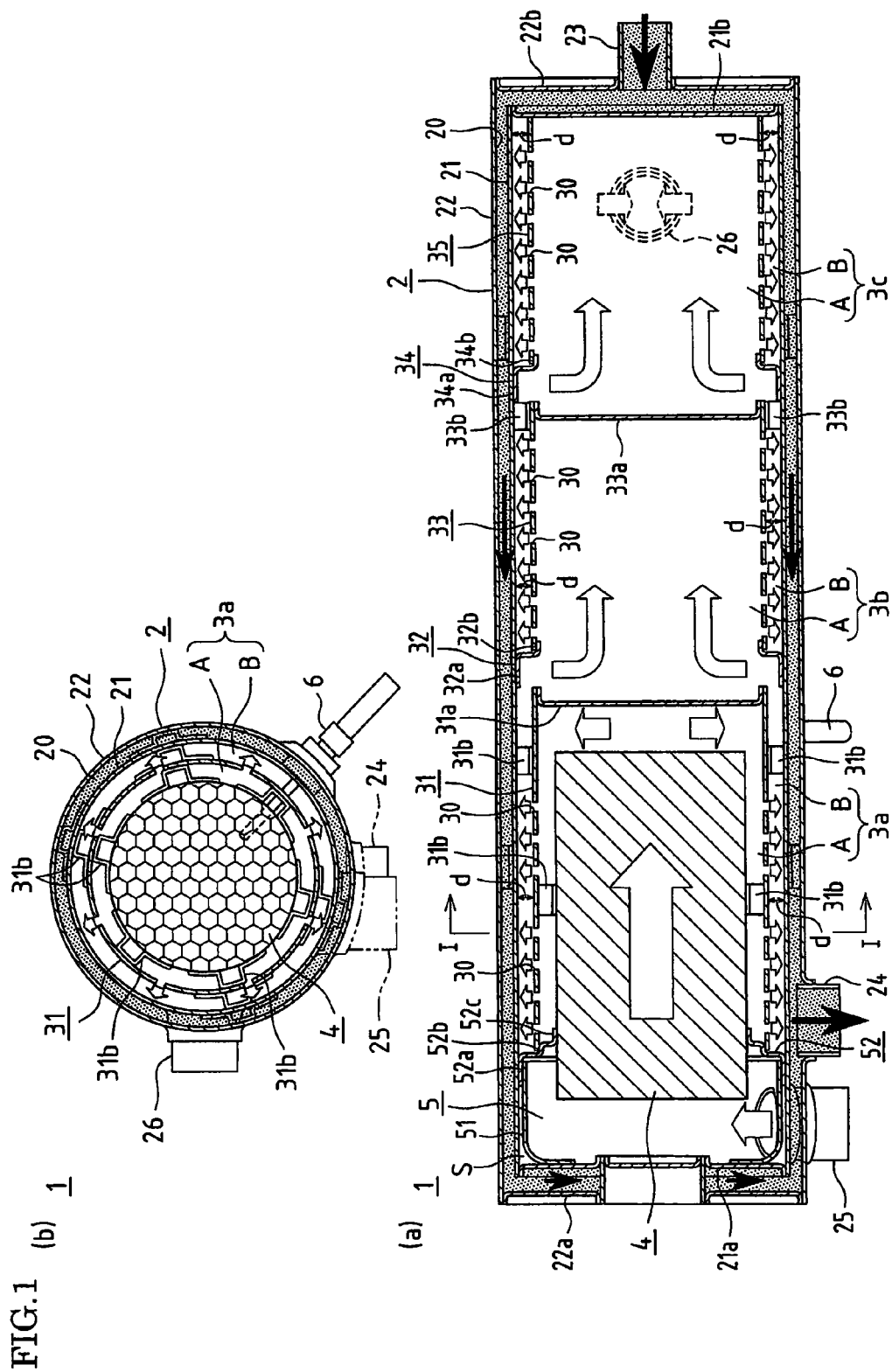
FIG. 1(a) is a cross-sectional diagram of an engine exhaust gas heat exchanger according to an embodiment of the present invention.
FIG. 1(b) is a cross-sectional diagram taken along the line I-I of FIG. 1(a).
Figure 2:
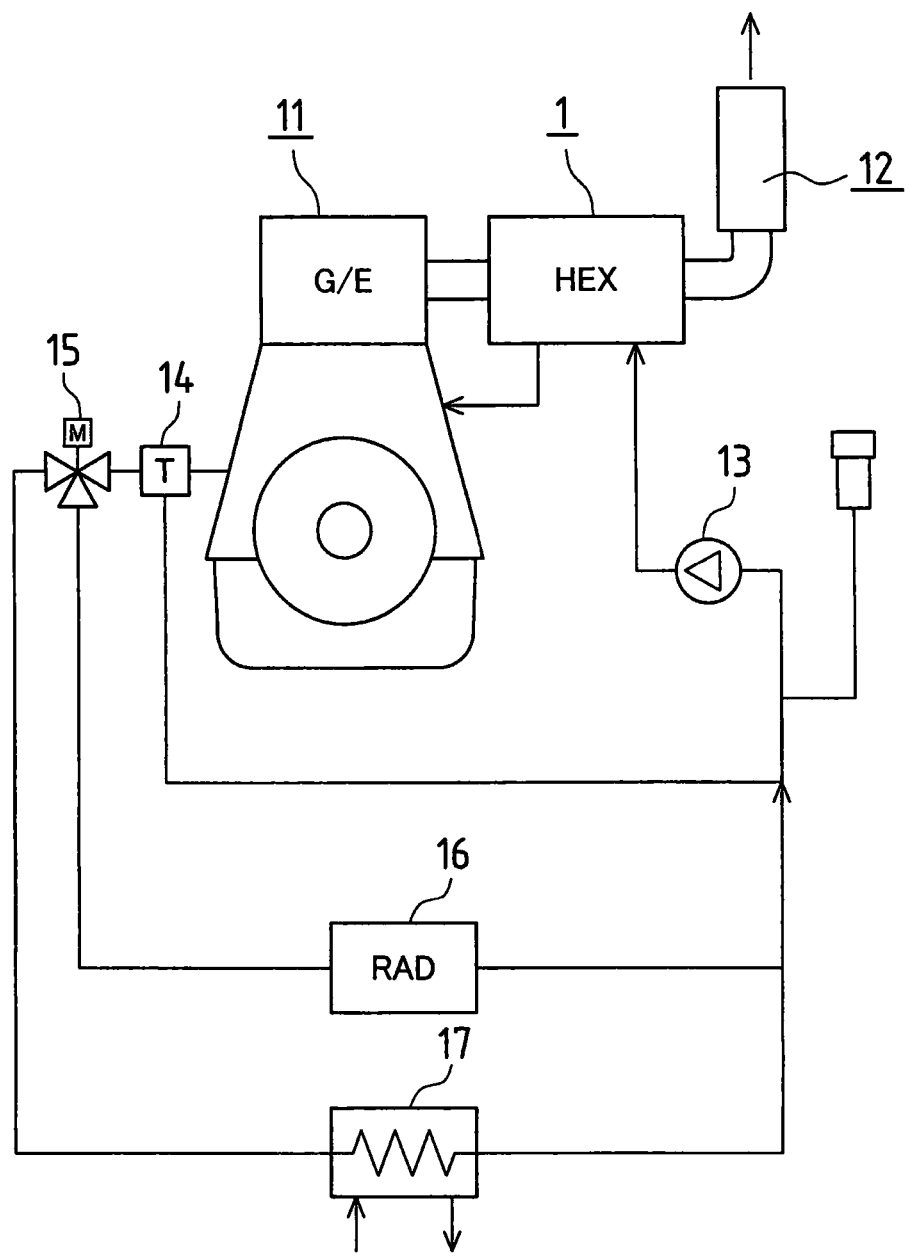
FIG. 2 is a diagram showing a coolant circuit of an engine provided with the engine exhaust gas heat exchanger shown in FIG. 1.

FIG. 1 shows an engine exhaust gas heat exchanger 1 according to the present invention, and FIG. 2 shows an example of a coolant circuit diagram of a gas engine 11 provided with the engine exhaust gas heat exchanger 1.

That is, the engine exhaust gas heat exchanger 1 is configured with unit exhaust gas passages 3a, 3b, 3c, which form three stages, composed of a first exhaust gas passage A and a second exhaust gas passage B provided inside an inner cylindrical pipe 21 of a heat exchanger 2.

The engine exhaust gas heat exchanger 1 is, as shown in FIGS. 1 and 2, provided such that exhaust gas from the engine 11 to a silencer 12 travels through a front chamber 5, an engine exhaust gas purification catalyst (hereinafter simply referred to as a catalyst) 4, and the unit exhaust gas passages 3a, 3b, 3c, inside the engine exhaust gas heat exchanger 1 and that the coolant of the engine 11 travels through the heat exchanger 2 of the engine exhaust gas heat exchanger 1 and then enters the engine 11. The coolant that has traveled through the engine 11 is configured to be recirculated by a pump 13. Also, the temperature of the coolant can be monitored by a thermostat 14, and the flow of the coolant can be switched toward a radiator 16 or a heat exchanger 17 by a three-way valve 15.

The heat exchanger 2 is composed of the inner cylindrical pipe 21 and an outer cylindrical pipe 22 as well as inner covers 21a, 21b and outer covers 22a, 22b provided at the respective ends thereof, and the space therebetween is a coolant passage 20 through which the coolant travels.

In the heat exchanger 2, the outer cover 22b is provided with a coolant introduction pipe 23 that is in communication with the coolant passage 20 at the second end, and the outer cylindrical pipe 22 is provided with a coolant effluent pipe 24 that is in communication with the coolant passage 20 at the first end. Accordingly, the coolant is introduced into the coolant passage 20 from the coolant introduction pipe 23, travels toward the first end side from the second end side of the heat exchanger 2, and then is discharged through the coolant effluent pipe 24.

Also, the heat exchanger 2 is provided at the first end with an exhaust gas introduction pipe 25 that penetrates the inner cylindrical pipe 21 and the outer cylindrical pipe 22 and that is in communication with the inside of the inner cylindrical pipe 21, and provided at the second end with an exhaust gas effluent pipe 26 that penetrates the inner cylindrical pipe 21 and the outer cylindrical pipe 22 and that is in communication with the inside of the inner cylindrical pipe 21. Accordingly, exhaust gas is configured so as to be introduced into the inner cylindrical pipe 21 through the exhaust gas introduction pipe 25, travels from the front chamber 5 formed in the inner cylindrical pipe 21 through the catalyst 4 and the three-stage unit exhaust gas passages 3a, 3b, 3c, and then is discharged through the exhaust gas effluent pipe 26.

The front chamber 5 is configured such that a tubular member 51, which is cylindrical and has a slightly smaller diameter than the inner cylindrical pipe 21 and one end of which forms a curved surface and the diameter of which gradually decreases, is provided inside the inner cylindrical pipe 21 so as to form a space S between the inner cylindrical pipe 21 and the tubular member 51. The first end that is on the smaller diameter side of the tubular member 51 is fixed to the inner cover 21a provided at the first end of the heat exchanger 2. The exhaust gas introduction pipe 25 is in communication with the inside of the tubular member 51. The second end of the tubular member 51 is provided with a cylindrical connecting member 52 to receive and be connected with the catalyst 4 and an exhaust gas discharge pipe 31. The connecting member 52 is configured such that the diameter of a cylindrical main body 52a part that is in contact with the inner circumferential surface of the inner cylindrical pipe 21 is reduced in a two-step manner so as to form an exhaust gas discharge pipe connecting part 52b and a catalyst connecting part 52c. The main body 52a part having the largest diameter is located between the inner cylindrical pipe 21 and the tubular member 51, and is fixed so as to maintain the space S between the inner cylindrical pipe 21 and the tubular member 51. The exhaust gas discharge pipe connecting part 52b receives and is connected with the exhaust gas discharge pipe 31 on the outside so as to form a space d between the inner cylindrical pipe 21 and the exhaust gas discharge pipe 31. The catalyst connecting part 52c receives and is connected with the catalyst 4 on the inside.

The unit exhaust gas passage 3a is configured with the exhaust gas discharge pipe 31 that is connected with the exhaust gas discharge pipe connecting part 52b of the connecting member 52 and a connecting member 32 provided on the downstream side of the exhaust gas discharge pipe 31.

The exhaust gas discharge pipe 31 can form the space d between the inner cylindrical pipe 21 and the exhaust gas discharge pipe 31, and is formed in a cylindrical shape having a diameter and a length that allows the catalyst 4 to be accommodated inside. In the circumferential wall of the exhaust gas discharge pipe 31, a plurality of apertures 30 are provided at regular intervals in the longitudinal direction and in the circumferential direction. The exhaust gas discharge pipe 31 is blocked by a cover 31a at the downstream end. The exhaust gas discharge pipe 31 is fixed inside the inner cylindrical pipe 21 by ribs 31b suitably provided in positions that are between the inner circumferential surface of the inner cylindrical pipe 21 and the exhaust gas discharge pipe 31 and that do not interfere with the apertures 30. The ribs 31b are also provided on the inner circumferential surface of the exhaust gas discharge pipe 31, thus making it possible to retain the catalyst 4 furnished more toward the center than the exhaust gas discharge pipe 31. While the catalyst 4 is retained, a thermometer 6 is provided between the catalyst 4 and the cover 31a so as to penetrate the outer cylindrical pipe 22 and the inner cylindrical pipe 21 as well as the exhaust gas discharge pipe 31 of the heat exchanger 2. It is desirable to monitor the temperature of the catalyst 4 since the purification effect is not effectively demonstrated depending on the exhaust gas temperature, and measuring the temperature by the thermometer 6 at a position immediately after exhaust gas has traveled through the catalyst 4 makes it possible to grasp, to some extent, the purifying state of the catalyst 4.

Beyond the cylindrical main body 32a part, the diameter of the connecting member 32 further decreases, thus forming an exhaust gas discharge pipe connecting part 32b. On the downstream side of the adjacent exhaust gas discharge pipe 31, the main body 32a part having the largest diameter is fixed to the inner circumferential surface of the inner cylindrical pipe 21. The exhaust gas discharge pipe connecting part 32b receives and is connected with on the outside an exhaust gas discharge pipe 33 that constitutes the unit exhaust gas passage 3b of the next stage so as to form a space d between the inner cylindrical pipe 21 and the exhaust gas discharge pipe 33.

Accordingly, the unit exhaust gas passage 3a forms the first exhaust gas passage A in which exhaust gas that has traveled through the catalyst is blocked by the cover 31a and discharged through the apertures 30 and the second exhaust gas passage B in which exhaust gas after being discharged through the apertures 30 travels through the space d between the exhaust gas discharge pipe 31 and the inner cylindrical pipe 21 and travels to the next-stage discharge pipe 33 through the discharge pipe connecting part 32b of the connecting member 32.

The unit exhaust gas passage 3b is configured with the exhaust gas discharge pipe 33 connected to the exhaust gas discharge pipe connecting part 32b of the connecting member 32 and a connecting member 34 provided on the downstream side of the exhaust gas discharge pipe 33.

The exhaust gas discharge pipe 33 is formed in a cylindrical shape that makes it possible to form the space d between the inner cylindrical pipe 21 and the exhaust gas discharge pipe 33. In the circumferential wall of the exhaust gas discharge pipe 33, a plurality of apertures 30 are provided at regular intervals in the longitudinal direction and in the circumferential direction. The exhaust gas discharge pipe 33 is blocked by a cover 33a at the downstream end. The exhaust gas discharge pipe 33 is fixed inside the inner cylindrical pipe 21 by ribs 33b suitably provided in positions on the outer circumferential surface at the downstream end, which are between the inner circumferential surface of the inner cylindrical pipe 21 and the exhaust gas discharge pipe 33 and do not interfere with the apertures 30.

Beyond a cylindrical main body 34a part, the diameter of the connecting member 34 further decreases, thus forming an exhaust gas discharge pipe connecting part 34b. On the downstream side of the adjacent exhaust gas discharge pipe 33, the main body 34a part having the largest diameter is fixed to the inner circumferential surface of the inner cylindrical pipe 21. The exhaust gas discharge pipe connecting part 34b receives and is connected with on the outside an exhaust gas discharge pipe 35 that constitutes the unit exhaust gas passage 3c of the next stage so as to form a space d between the inner cylindrical pipe 21 and the exhaust gas discharge pipe 35.

Accordingly, the unit exhaust gas passage 3b forms the first exhaust gas passage A in which exhaust gas that has traveled through the discharge pipe connecting part 32b of the connecting member 32 is blocked by the cover 33a and discharged through the apertures 30 and the second exhaust gas passage B in which exhaust gas after being discharged through the apertures 30 travels through the space d between the exhaust gas discharge pipe 33 and the inner cylindrical pipe 21 and travels to the next-stage discharge pipe 35 through the discharge pipe connecting part 34b of the connecting member 34.

The unit exhaust gas passage 3c is configured with the exhaust gas discharge pipe 35 connected to the exhaust gas discharge pipe connecting part 34b of the connecting member 34 and the exhaust gas effluent pipe 26.

The exhaust gas discharge pipe 35 is formed in a cylindrical shape that makes it possible to form the space d between the inner cylindrical pipe 21 and the exhaust gas discharge pipe 35. In the circumferential wall of the exhaust gas discharge pipe 35, a plurality of apertures 30 are provided at regular intervals in the longitudinal direction and in the circumferential direction. The length of the exhaust gas discharge pipe 35 is adjusted such that the downstream end is blocked by the inner cover 21b on the second end side of the heat exchanger 2. The downstream end of the exhaust gas discharge pipe 35 is fixed to the inner cover 21b on the second end side of the heat exchanger 2.

Accordingly, the unit exhaust gas passage 3c forms the first exhaust gas passage A in which exhaust gas that has traveled through the discharge pipe connecting part 34b of the connecting member 34 is blocked by the inner cover 21b and discharged through the apertures 30 and the second exhaust gas passage B in which exhaust gas after being discharged through the apertures 30 travels through the space d between the exhaust gas discharge pipe 35 and the inner cylindrical pipe 21 and discharged through the exhaust gas effluent pipe 26.

According to the engine exhaust gas heat exchanger 1 thus configured, exhaust gas from the engine travels through the exhaust gas introduction pipe 25, the exhaust gas front chamber 5, the catalyst 4 and the unit exhaust gas passages 3a, 3b, 3c, and then is discharged through the exhaust gas effluent pipe 26. In this case, exhaust gas is configured so as not to be discharged at once through all the apertures 30, but is configured so as to be discharged through the apertures 30 of the unit exhaust gas passage 3a and then recovered, discharged through the apertures 30 of the unit exhaust gas passage 3b of the next stage and then recovered again, and discharged through the apertures 30 of the unit exhaust gas passage 3c of the next stage. Therefore, the discharge rate of exhaust gas discharged toward the inner cylindrical pipe 21 of the heat exchanger 2 through the apertures 30 can be maintained at a constant level without being reduced in the unit exhaust gas passages 3a, 3b, 3c. Accordingly, a decrease of the flow rate per aperture 30 is prevented, thus making it possible to maintain a specific average heat transfer coefficient (K value).

Also, the front chamber 5 forms the space S between the tubular member 51 and the inner cylindrical pipe 21, thus making it possible to prevent exhaust gas that enters through the exhaust gas introduction pipe 25 from being cooled by coolant via the inner cylindrical pipe 21. Accordingly, a temperature decrease of exhaust gas before flowing into the catalyst 4 is prevented, thus making it possible to activate the reaction in the catalyst 4.

Note that the average heat transfer coefficient (K value) is dependent on the discharge rate of exhaust gas discharged toward the inner cylindrical pipe 21 of the heat exchanger 2 through the apertures 30 (the rate of traveling through the apertures), and the average heat transfer coefficient characteristically is increased as the flow rate is increased.

As a means of further increasing the amount of heat exchange of the engine exhaust gas heat exchanger as a whole, the number of the apertures 30 in an upper stage where the temperature of the engine exhaust gas temperature is high may be reduced or the diameter of the apertures 30 may be made small to increase the flow rate. It is thus possible to increase the average heat transfer coefficient (K value) in a place where the temperature difference between the engine exhaust gas temperature and the coolant temperature is large, thus making it possible to obtain a larger amount of heat exchange than increasing the average heat transfer coefficient (K value) in a lower stage where the temperature difference between the engine exhaust gas temperature and the coolant temperature is small.

Exhaust gas that has traveled through the apertures 30 of the unit exhaust gas passage 3a of the first stage is heat-exchanged, discharged through the apertures 30 of the unit exhaust gas passage 3b of the second stage and further heat-exchanged therein, and then discharged through the apertures 30 of the unit exhaust gas passage 3c of the third stage. Accordingly, the temperature of exhaust gas is decreased as it travels toward lower stages even if the decrease of the flow rate when exhaust gas is discharged through the apertures 30 is prevented. If this results in an increased exhaust gas density and a decreased flow rate and makes it difficult to maintain a specific average heat transfer coefficient (K value), it may be configured such that the more toward the lower stage, the more reduced the number of the apertures 30 or the diameter of the apertures 30, in order to increase the flow rate. This makes it possible to maintain a specific average heat transfer coefficient (K value) for the apertures 30. Accordingly, the total areas of the apertures (the number of the apertures 30×area per aperture) in the respective unit exhaust gas passages are configured to be the same for all stages or partially different according to the heat exchangeability required of the engine exhaust gas heat exchanger, thus making it possible to obtain optimal heat exchangeability.

Figure 4:
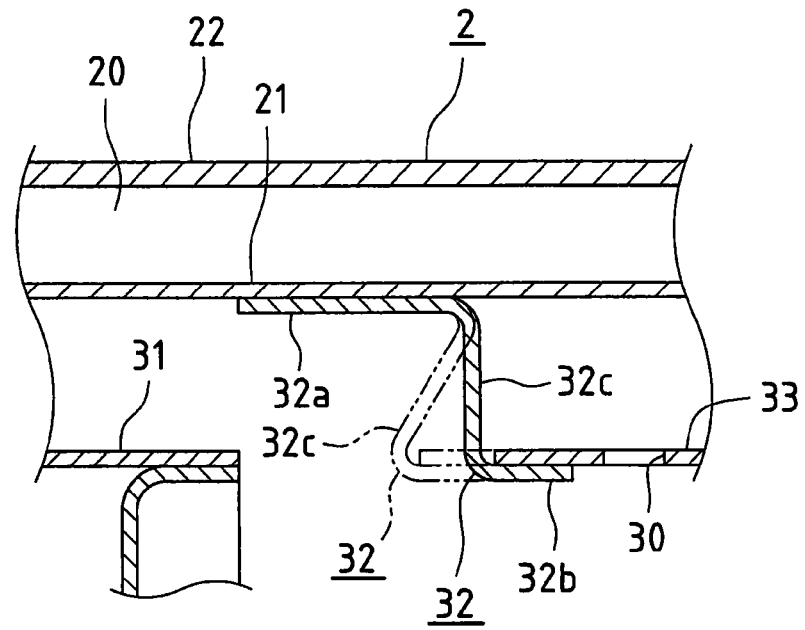
FIG. 4 is a partially enlarged cross-sectional diagram showing a connecting member of an engine exhaust gas heat exchanger according to the present invention.

Also, the engine exhaust gas heat exchanger 1 according to this embodiment creates a large temperature difference between the inner cylindrical pipe 21 through which coolant travels and the exhaust gas discharge pipes 31, 33, 35 through which exhaust gas is discharged. In this case, the inner cylindrical pipe 21 is cooled by the coolant and shrinks and the exhaust gas discharge pipes 31, 33, 35 are heated by the exhaust gas and expand. Therefore, the exhaust gas discharge pipes 31, 33, 35 become elongated relative to the inner cylindrical pipe 21. In this regard, as shown in, for example, FIG. 4, if the decreased-diameter part 32c between the main body 32a and the exhaust gas discharge pipe connecting part 32b of the connecting member 32 is composed of an elastically deformable material, it is possible to respond to a length change resulting from such thermal expansion of the exhaust gas discharge pipe 33. Similarly configuring the connecting member 34 makes it possible to respond to a length change resulting from thermal expansion of the exhaust gas discharge pipe 35.

Figure 3:
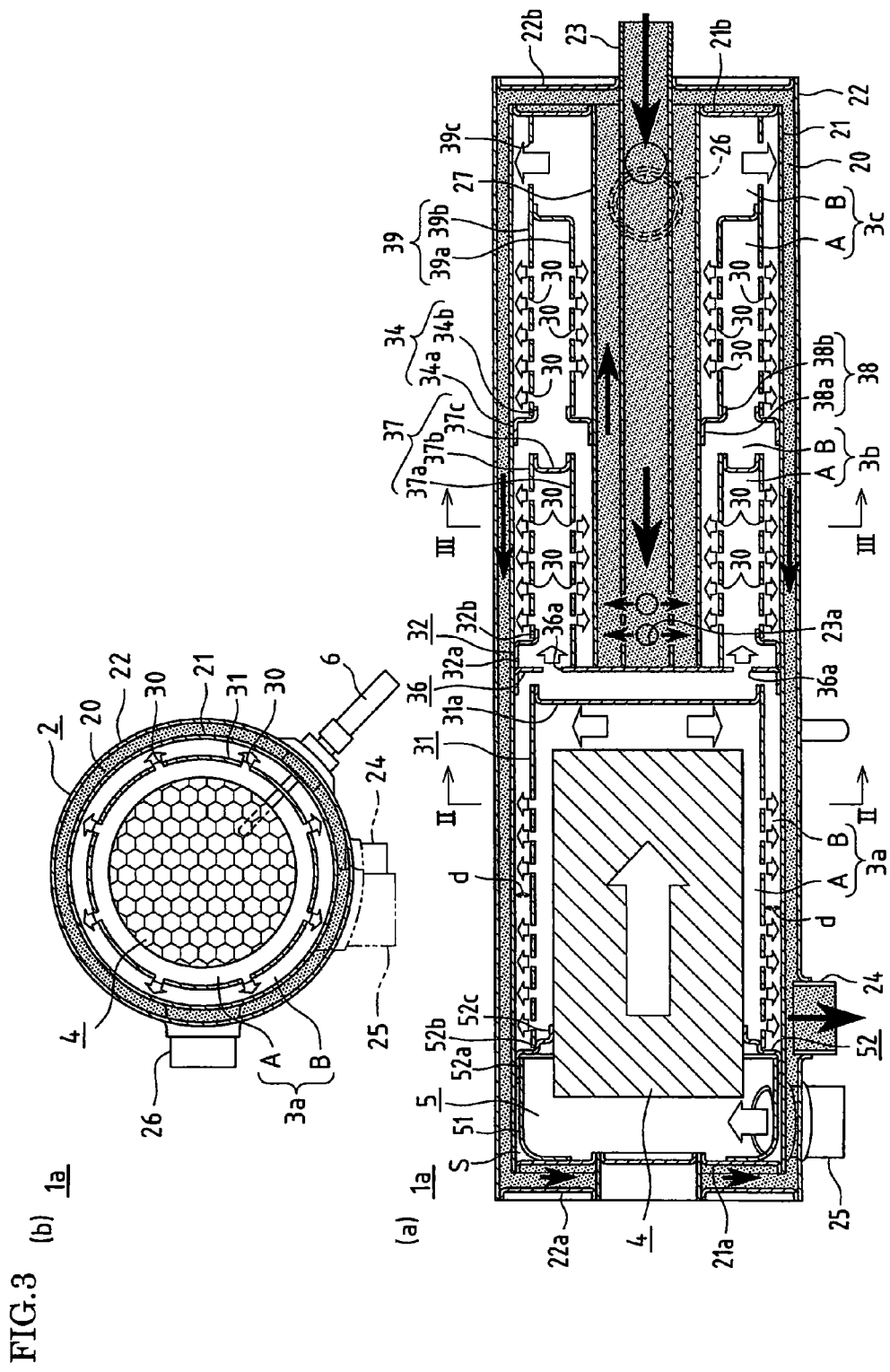
FIG. 3(a) is a cross-sectional diagram showing another embodiment of an engine exhaust gas heat exchanger of the present invention.
FIG. 3(b) is a cross-sectional diagram taken along the line II-II of FIG. 3(a).

FIG. 3 shows an engine exhaust gas heat exchanger 1a according to another embodiment of the present invention. In FIG. 3, the members that are identical to those in FIGS. 1 and 2 are given the same references, and descriptions thereof are omitted.

The engine exhaust gas heat exchanger 1a is configured such that coolant enters inside the second-stage unit exhaust gas passage 3b and the third-stage unit exhaust gas passage 3c, and the second-stage unit exhaust gas passage 3b and the third-stage unit exhaust gas passage 3c are configured so as to undergo heat exchange also with the coolant that has entered inside.

In the engine exhaust gas heat exchanger 1a, a shield 36 that separates the first-stage unit exhaust gas passage 3a and the second-stage unit exhaust gas passages 3b is provided in the position of the main body 32a part of the connecting member 32 constituting the first-stage unit exhaust gas passage 3a.

The coolant introduction pipe 23 is provided so as to extend through the inner cover 21b and the outer cover 22b at the second end of the heat exchanger 2 to reach as far as the shield 36, and openings 23a are provided at the extending end. Outside the coolant introduction pipe 23 is provided a core pipe 27. The core pipe 27 is provided between the inner cover 21b at the second end of the heat exchanger 2 and the shield 36, and is in communication with the coolant passage 20 inside the inner cover 21b. Accordingly, coolant is introduced to the position of the second-stage unit exhaust gas passage 3b where the openings 23a of the coolant introduction pipe 23 are provided, flows into the core pipe 27, flows to the second end of the heat exchanger 2, flows into the coolant passage 20, and then is discharged through the coolant effluent pipe 24.

The shield 36 is provided with a plurality of exhaust gas passing holes 36a arranged in a circular pattern at positions of a specific radius of curvature. On the surface on the downstream side of the shield 36, i.e., the second-stage unit exhaust gas passage 3b side, an exhaust gas discharge pipe 37 having a dual-pipe structure composed of an inner exhaust gas discharge pipe 37a and an outer exhaust gas discharge pipe 37b is provided, and exhaust gas entering through the exhaust gas passing holes 36a of the shield 36 is introduced between the inner exhaust gas discharge pipe 37a and the outer exhaust gas discharge pipe 37b.

Figure 5:
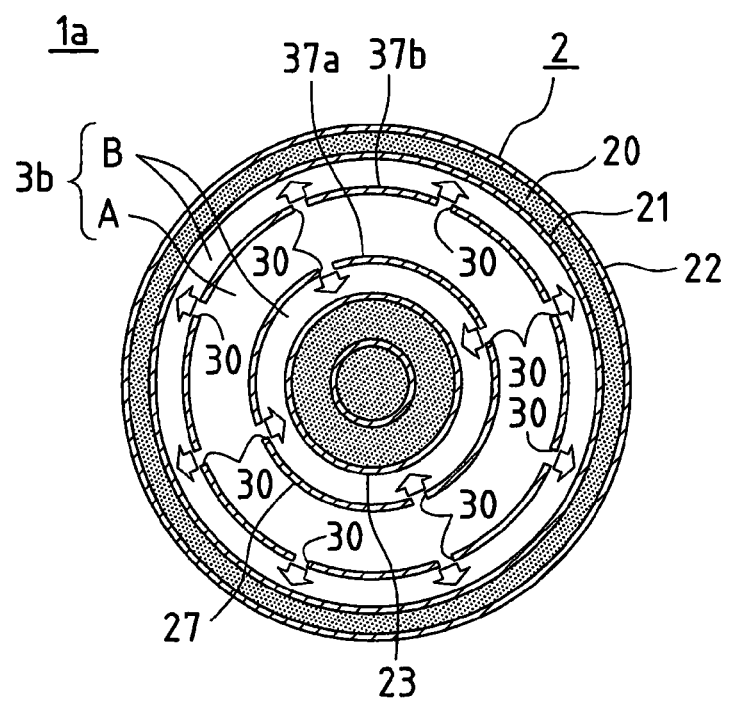
FIG. 5 is a cross-sectional diagram taken along the line of FIG. 3(a).

The exhaust gas discharge pipe 37 is blocked by being provided with a circular cover 37c at the downstream end of the inner exhaust gas discharge pipe 37a and the outer exhaust gas discharge pipe 37b. Regarding the exhaust gas discharge pipe 37, in the circumferential walls of the inner exhaust gas discharge pipe 37a and the outer exhaust gas discharge pipe 37b, a plurality of apertures 30 are provided at regular intervals in the longitudinal direction and in the circumferential direction. As shown in FIG. 5, the inner exhaust gas discharge pipe 37a is provided with the apertures 30 at a 90 degree pitch in the circumferential direction, and the outer exhaust gas discharge pipe 37b is provided with the apertures 30 at a 45 degree pitch in the circumferential direction. That is, the apertures 30 provided in the outer exhaust gas discharge pipe 37b discharge exhaust gas toward the inner circumferential surface of the inner cylindrical pipe 21 that has a large diameter than the outer exhaust gas discharge pipe 37b, while the apertures 30 provided in the inner exhaust gas discharge pipe 37a discharge exhaust gas toward the core pipe 27 that has a smaller diameter than the inner exhaust gas discharge pipe 37a. Therefore, configuring the number of the apertures 30 provided in the outer exhaust gas discharge pipe 37b so as to be larger than the number of the apertures 30 provided in the inner exhaust gas discharge pipe 37a by selecting different pitches for the apertures 30 in the outer exhaust gas discharge pipe 37b and the inner exhaust gas discharge pipe 37a as described above makes it possible to attain a uniform unit heat transfer area per aperture 30. Note that the pitch is not particularly limited to 90 degrees or 45 degrees, and is suitably determined according to the size of the inner circumferential surface of the inner cylindrical pipe 21 toward which exhaust gas is discharged from the outer exhaust gas discharge pipe 37b as well as the outer circumferential surface of the core pipe 27 toward which exhaust gas is discharged from the inner exhaust gas discharge pipe 37a.

In the position of the core pipe 27 corresponding to the position of the connecting member 34 is provided a core connecting member 38. The core connecting member 38 is configured so as to form an inner pipe connecting part 38b by further increasing its diameter beyond a cylindrical main body 38a part that can be fixed to the outer circumferential surface of the core pipe 27. The exhaust gas discharge pipe connecting part 34b of the connecting member 34 receives and is connected with on the outside an outer exhaust gas discharge pipe 39b that constitutes the unit exhaust gas passage 3c of the next stage. Also, the inner pipe connecting part 38b of the core connecting member 38 receives and is connected with on the inside an inner exhaust gas discharge pipe 39a that constitutes the unit exhaust gas passage 3c of the next stage.

Accordingly, the unit exhaust gas passage 3b of the second stage forms the first exhaust gas passage A in which exhaust gas that has traveled through the exhaust gas passing holes 36a of the shield 36 is blocked by the cover 37c and discharged through the apertures 30 provided in both inner exhaust gas discharge pipe 37a and outer exhaust gas discharge pipe 37b and the second exhaust gas passage B in which exhaust gas after being discharged through the apertures 30 travels through the space d between the outer exhaust gas discharge pipe 37b and the inner cylindrical pipe 21 and the space d between the inner exhaust gas discharge pipe 37a and the core pipe 27 and enters the next-stage exhaust gas discharge pipe 39 through between the discharge pipe connecting part 34b of the connecting member 34 and the inner pipe connecting part 38b of the core pipe connecting member 38.

The unit exhaust gas passage 3c is configured with the exhaust gas effluent pipe 26 and the exhaust gas discharge pipe 39 connected to the exhaust gas discharge pipe connecting part 34b of the connecting member 34 and the inner pipe connecting part 38b of the core pipe connecting member 38.

The exhaust gas discharge pipe 39, as with the exhaust gas discharge pipe 37, has a dual-pipe structure composed of the inner exhaust gas discharge pipe 39a and the outer exhaust gas discharge pipe 39b, and is configured so as to allow exhaust gas to be discharged through the apertures 30 provided in the outer exhaust gas discharge pipe 39b and the inner exhaust gas discharge pipe 39a toward the inner cylindrical pipe 21 and the core pipe 27, respectively. The apertures 30 in the inner exhaust gas discharge pipe 39a are provided at a 90 degree pitch in the circumferential direction, and the apertures 30 in the outer exhaust gas discharge pipe 39b are provided at a 45 degree pitch in the circumferential direction. The downstream end of the inner exhaust gas discharge pipe 39a has an increased diameter to contact and is fixed to the outer exhaust gas discharge pipe 39b. The downstream end of the outer exhaust gas discharge pipe 39b is fixed to the inner cover 21b on the second end side of the heat exchanger 2 while being in contact therewith. Also, near the downstream end of the outer exhaust gas discharge pipe 39b, passing holes 39c that allow exhaust gas discharged from the inner exhaust gas discharge pipe 39a to travel through are provided.

Accordingly, the unit exhaust gas passage 3c of the third stage forms the first exhaust gas passage A in which exhaust gas that has traveled between the inner exhaust gas discharge pipe 39a and the outer exhaust gas discharge pipe 39b through the space between the exhaust gas discharge pipe connecting part 34b of the connecting member 34 and the inner pipe connecting part 38b of the core pipe connecting member 38 is blocked at the downstream end and discharged through the apertures 30 provided in both inner exhaust gas discharge pipe 39a and outer exhaust gas discharge pipe 39b and the second exhaust gas passage B in which exhaust gas after being discharged through the apertures 30 travels through the space d between the outer exhaust gas discharge pipe 39b and the inner cylindrical pipe 21 and the space d between the inner exhaust gas discharge pipe 39a and the core pipe 27 and is discharged through the exhaust gas effluent pipe 26. According to the engine exhaust gas heat exchanger 1a thus configured, exhaust gas is discharged through the inner exhaust gas discharge pipes 37a, 39a, thus making it possible to exchange heat on the outer circumferential surface of the core pipe 27. Therefore, this makes it possible to secure a large heat transfer area without increasing the overall length and the overall diameter of the exhaust gas heat exchanger 1.

Figure 6:
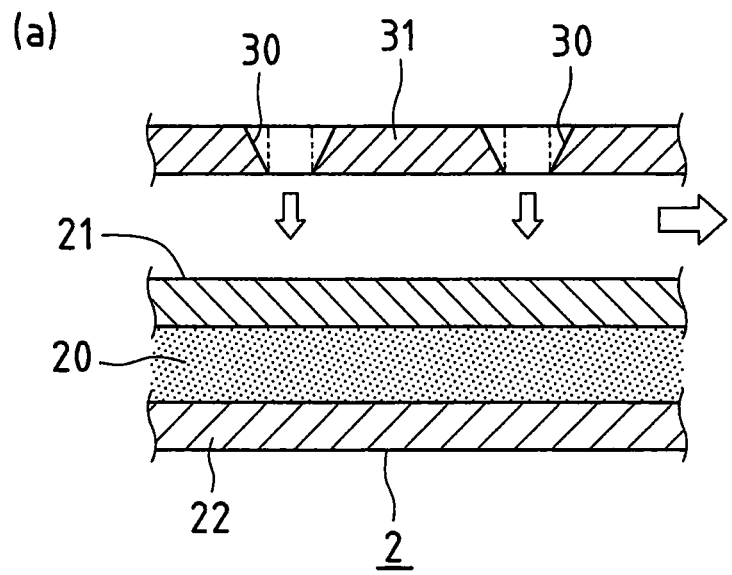
FIG. 6(a) is an enlarged cross-sectional diagram showing apertures of an engine exhaust gas heat exchanger according to another embodiment of the present invention.
FIG. 6(b) is an enlarged cross-sectional diagram showing apertures in a different shape.
Figure 6:
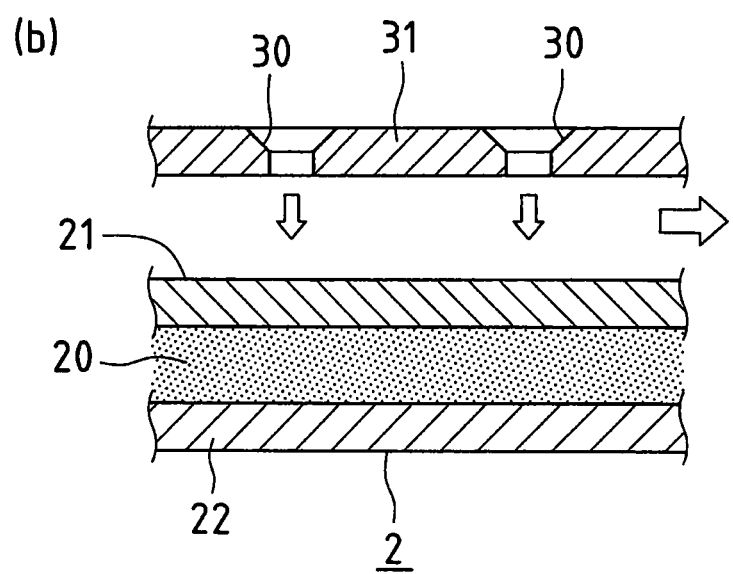

FIG. 6 shows other embodiments of the apertures 30 in the engine exhaust gas heat exchanger 1 of the present invention. In FIG. 6, the members that are identical to those in FIG. 1 are given the same references, and descriptions thereof are omitted.

That is, the apertures 30 has such a shape that the area through which exhaust gas travels gradually decreases from the inlet toward the outlet of the apertures 30.

As for the shape of the apertures 30, the apertures may be created in a truncated cone shape with which the diameter gradually decreases over the entire thickness direction of the exhaust gas discharge pipe 31 as shown in FIG. 6(a), or as shown in FIG. 6(b), the apertures may be created so as to have a truncated cone shape with which the diameter gradually decreases from the inlet side until the midsection in the thickness direction of the exhaust gas discharge pipe 31 and a cylindrical shape having the same diameter as the outlet from the midsection.

In the case of the engine exhaust gas heat exchanger 1 that has apertures 30 shaped to have a gradually decreased diameter as described above, the apertures 30 provided in the exhaust gas discharge pipes 31, 33, are shaped such that the area through which exhaust gas travels gradually decreases from the inlet toward the outlet, thus making it possible to reduce the exhaust gas pressure loss at the same aperture traveling rate. Accordingly, it is possible to raise the aperture traveling rate relative to the designed allowable pressure loss value of the heat exchanger 2, and it is possible to increase the average heat transfer coefficient and increase the heat exchange amount. In particular, in the case of the engine exhaust gas heat exchanger 1 having the above-described configuration, the exhaust gas discharge rate can be kept constant without a decrease in the unit exhaust gas passages 3a, 3b, 3c, and therefore, the apertures 30 having such a configuration will function effectively.

Note that, in this embodiment, a modification of the shape of the apertures 30 in the engine exhaust gas heat exchanger 1 of FIG. 1 has been described, and such a configuration of the apertures 30 may be applied to the engine exhaust gas heat exchanger 1a of FIG. 3. That is, not only the apertures 30 facing the inner cylindrical pipe 21 but also the apertures 30 facing the core pipe 27 may be the apertures 30 shown in FIG. 6.

Figure 7:
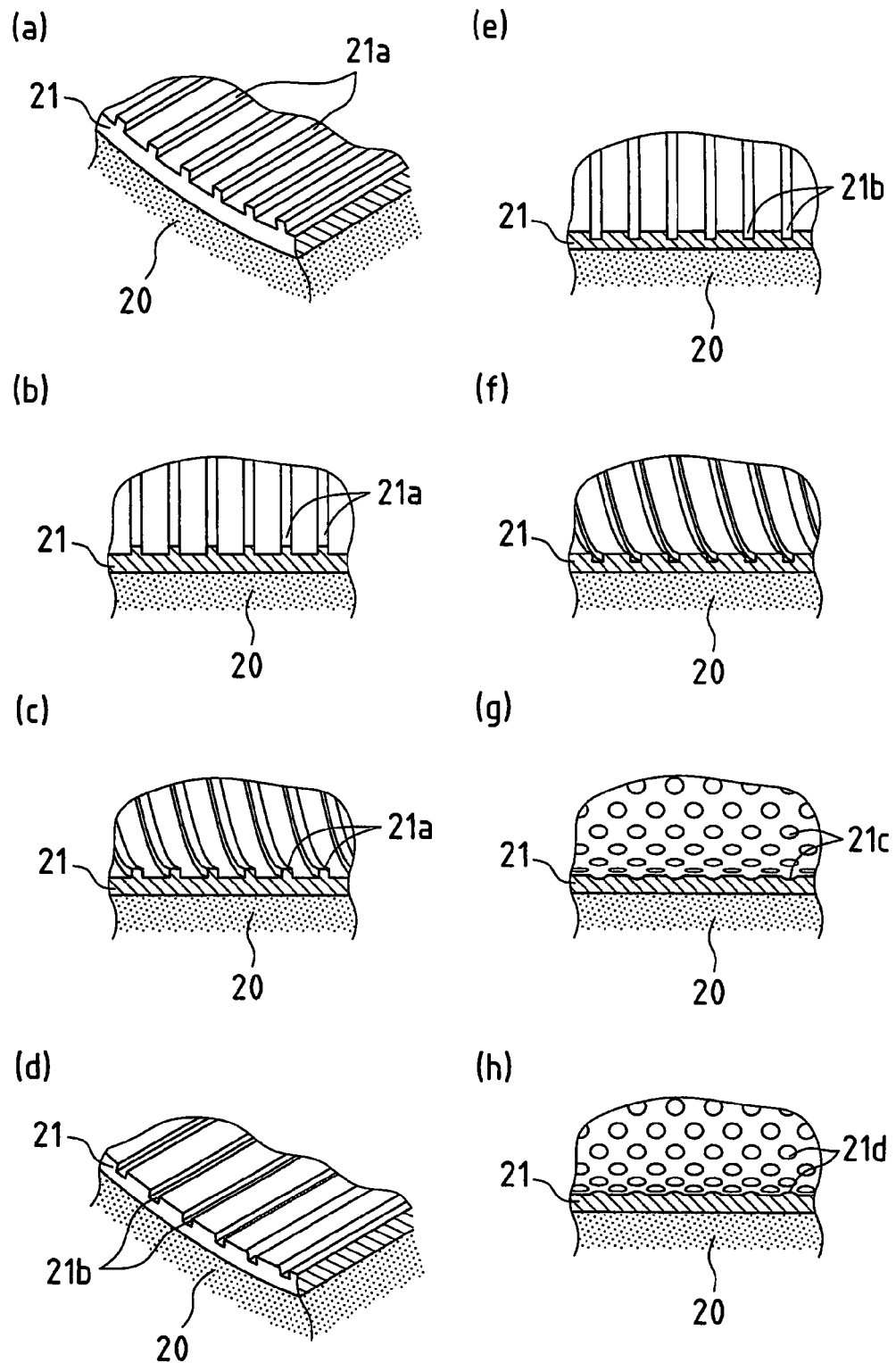
FIGS. 7(a) to 7(h) are partial cross-sectional diagrams showing configurations of various inner circumferential surfaces of inner cylindrical pipes for an engine exhaust gas heat exchanger according to another embodiment of the present invention.

Also, in this embodiment, the apertures 30 are shaped to have a diameter that gradually decreases from the inside toward the outside of the circumferential wall. In combination with this configuration of the apertures 30, groove processing may be performed on the inner circumferential surface of the inner cylindrical pipe 21 with which gas discharged through the apertures 30 collides. In this case, the inner circumferential surface of the inner cylindrical pipe 21 can disrupt the flow of exhaust gas that is blown against the inner circumferential surface, thus making it possible to increase the heat exchange amount. As shown in FIG. 7, regarding the shape attained by groove processing, projections 21a projecting toward the inner circumferential surface side may be formed in the length direction of the inner cylindrical pipe 21 (see FIG. 7 (a)), may be formed in the circumferential direction (see to FIG. 7 (b)), or may be formed diagonally, i.e., in a spiral shape, relative to the circumferential direction so as to create a vortex in the flow direction of exhaust gas (see FIG. 7 (c)). As shown in FIG. 7(d) or FIG. 7(f), this groove processing may form trough-like grooves 21b so as to have hollows on the inner circumferential surface side of the inner cylindrical pipe 21. Moreover, to achieve the same effect as this groove processing, dimple processing may be performed on the inner circumferential surface of the inner cylindrical pipe 21 against which gas discharged through the apertures 30 hits. As shown in FIG. 7(g), the shape of dimples may be depressions 21c having circular hollows as provided on a golf ball. As shown in FIG. 7(h), this dimple processing may form protrusions 21d that have a circular shape protruding toward the inner circumferential surface side of the inner cylindrical pipe 21.

Moreover, in this embodiment, the engine exhaust gas heat exchanger 1 is configured with three unit exhaust gas passages 3a, 3b, 3c, but the number of passages is not particularly limited to three, and as long as multiple passages are provided, the number thereof may be two or four or more.

The present invention may be embodied in various other forms without departing from the spirit or essential characteristics thereof. The embodiments disclosed in this application are, therefore, to be considered in all respects as illustrative and not limiting. The scope of the invention is indicated by the appended claims rather than by the foregoing description, and all modifications and changes that come within the range of equivalency of the claims are intended to be embraced therein.

INDUSTRIAL APPLICABILITY

The present invention can be used as an exhaust gas heat exchanger for various engines used in air-conditioners and cogeneration systems.

REFERENCE SIGNS LIST

1 Engine exhaust gas heat exchanger
11 Engine
A First exhaust gas passage
B Second exhaust gas passage
2 Heat exchanger
20 Coolant passage
21 Inner cylindrical pipe (Exhaust gas colliding surface)
21a Projection (Groove processing)
21b Trough-like groove (Groove processing)
21c Depression (Groove processing)
21d Protrusion (Groove processing)
22 Outer cylindrical pipe
26 Exhaust gas outlet
27 Core pipe (Coolant passage)
3a, 3b, 3c Unit exhaust gas passage
30 Aperture
31, 33, 35, 37, 39 Exhaust gas discharge pipe
32, 34, 38 Connecting member
37a, 39a Inner exhaust gas discharge pipe
37b, 39b Outer exhaust gas discharge pipe
4 Engine exhaust gas purification catalyst

The invention claimed is:

1. An engine exhaust gas heat exchanger that is an exchanger of heat between engine exhaust gas and coolant and in which a plurality of apertures facing a coolant passage are provided in a circumferential direction and in an exhaust gas flow direction of an exhaust gas passage to allow the entire amount of exhaust gas to collide with the coolant passage,
the engine exhaust gas heat exchanger being provided with multiple stages of a unit exhaust gas passage that is configured with a first exhaust gas passage in which a plane facing an inlet is blocked and that has a plurality of apertures in a circumferential direction and in a flow direction, and a second exhaust gas passage that has a dividing wall facing the apertures and also serving as the coolant passage and an outlet that also serves as an inlet of the first exhaust gas passage of a next stage or an outlet of the engine exhaust gas heat exchanger,
wherein, a total area of the apertures in each unit exhaust gas passage is decreased in all stages as it goes toward the lower stage by reducing the number of the apertures or respective diameters of the apertures, or the total area of the apertures in each unit exhaust gas passage is decreased in some stages as it goes toward the lower stage by reducing the number of the apertures or the respective diameters of the apertures.

2. The engine exhaust gas heat exchanger according to claim 1, wherein
the coolant passage is provided on both inner circumferential side and outer circumferential side of the unit exhaust gas passage, and the apertures facing the respective coolant passages are provided in the first exhaust gas passage.

3. The engine exhaust gas heat exchanger according to claim 2, wherein
the apertures facing the coolant passage on the outer circumferential side are provided in greater number than the apertures facing the coolant passage on the inner circumferential side.

4. The engine exhaust gas heat exchanger according to claim 1, wherein
for every unit exhaust gas passage, a dividing wall having the apertures of the first exhaust gas passage is elastically supported in an axial direction of the unit exhaust gas passage by the dividing wall of the second exhaust gas passage facing the apertures and also serving as the coolant passage.

5. The engine exhaust gas heat exchanger according to claim 1, wherein
an exhaust gas purification catalyst is partially or entirely accommodated in the first exhaust gas passage of a first-stage unit exhaust gas passage, and an exhaust gas temperature sensor is provided between an outlet plane of the catalyst and the blocked plane of the first exhaust gas passage.

6. The engine exhaust gas heat exchanger according to claim 1, wherein groove processing is performed on an exhaust gas colliding surface of the coolant passage.

7. The engine exhaust gas heat exchanger according to claim 1, wherein groove processing is performed on an exhaust gas colliding surface of the coolant passage.

8. An energy supplying device, such as an engine-driven heat pump and a cogeneration, in which an engine exhaust gas heat exchanger of claim 1 is used in an engine exhaust gas passage.

9. An energy supplying device, such as an engine-driven heat pump and a cogeneration, in which an engine exhaust gas heat exchanger of claim 2 is used in an engine exhaust gas passage.

10. An energy supplying device, such as an engine-driven heat pump and a cogeneration, in which an engine exhaust gas heat exchanger of claim 3 is used in an engine exhaust gas passage.

11. An energy supplying device, such as an engine-driven heat pump and a cogeneration, in which an engine exhaust gas heat exchanger of claim 4 is used in an engine exhaust gas passage.

12. An energy supplying device, such as an engine-driven heat pump and a cogeneration, in which an engine exhaust gas heat exchanger of claim 5 is used in an engine exhaust gas passage.

13. An energy supplying device, such as an engine-driven heat pump and a cogeneration, in which an engine exhaust gas heat exchanger of claim 1 is used in an engine exhaust gas passage.

14. An energy supplying device, such as an engine-driven heat pump and a cogeneration, in which an engine exhaust gas heat exchanger of claim 1 is used in an engine exhaust gas passage.

15. An energy supplying device, such as an engine-driven heat pump and a cogeneration, in which an engine exhaust gas heat exchanger of claim 1 is used in an engine exhaust gas passage.

16. An energy supplying device, such as an engine-driven heat pump and a cogeneration, in which an engine exhaust gas heat exchanger of claim 6 is used in an engine exhaust gas passage.

17. An energy supplying device, such as an engine-driven heat pump and a cogeneration, in which an engine exhaust gas heat exchanger of claim 7 is used in an engine exhaust gas passage.

* * * * *